US012724436B2

(12) United States Patent
Takahashi et al.

(10) Patent No.: US 12,724,436 B2
(45) Date of Patent: Sep. 1, 2026

(54) OPERATION FACILITY FOR UNMANNED AERIAL VEHICLE

(71) Applicant: Daifuku Co., Ltd., Osaka (JP)

(72) Inventors: Toyoki Takahashi, Komaki (JP); Keisuke Takeno, Komaki (JP); Satoshi Nitta, Komaki (JP); Hidemoto Fukushima, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 385 days.

(21) Appl. No.: 18/242,791

(22) Filed: Sep. 6, 2023

(65) Prior Publication Data

US 2024/0077893 A1 Mar. 7, 2024

(30) Foreign Application Priority Data

Sep. 7, 2022 (JP) ................................ 2022-142370

(51) Int. Cl.

| | |
|---|---|
| ***G05D 16/00*** | (2006.01) |
| *B64U 10/10* | (2023.01) |
| *B64U 101/60* | (2023.01) |
| *B64U 101/70* | (2023.01) |

(52) U.S. Cl.

CPC ........... *G05D 16/028* (2019.01); *B64U 10/10* (2023.01); *B64U 2101/60* (2023.01); *B64U 2101/70* (2023.01)

(58) Field of Classification Search

CPC .. G05D 16/028; B64U 10/10; B64U 2101/60; B64U 2101/70; B64U 10/13; B64F 1/32; B65G 1/00

USPC ........................................................ 700/276

See application file for complete search history.

(56) References Cited

U.S. PATENT DOCUMENTS

| | | | | |
|---|---|---|---|---|
| 9,221,557 | B1 * | 12/2015 | Friesel | B64U 70/60 |
| 2017/0175413 | A1 * | 6/2017 | Curlander | B64F 1/025 |
| 2022/0001288 | A1 * | 1/2022 | Metni | A63G 31/00 |
| 2022/0212813 | A1 * | 7/2022 | Zhang | B60L 53/80 |

FOREIGN PATENT DOCUMENTS

| | | | | | |
|---|---|---|---|---|---|
| CN | 109878752 | A | | 6/2019 | |
| CN | 110356761 | A | * | 10/2019 | G05D 1/101 |
| JP | H06296764 | A | * | 10/1994 | A63G 31/00 |
| JP | 2009137675 | A | | 6/2009 | |
| JP | 202051176 | A | | 4/2020 | |
| JP | 2020051176 | A | * | 4/2020 | |
| JP | 202120529 | A | | 2/2021 | |

* cited by examiner

*Primary Examiner* — Kamini S Shah
*Assistant Examiner* — Michael Tang
(74) *Attorney, Agent, or Firm* — The Webb Law Firm

(57) ABSTRACT

An operation facility for an unmanned aerial vehicle with rotary wing of the present invention includes a passage space that extends in the up-down direction and is for the ascent and descent of the unmanned aerial vehicle; and an air pressure control system that controls the air pressure in the passage space. The air pressure control system performs control such that the air pressure above the unmanned aerial vehicle is lower than the air pressure below the unmanned aerial vehicle.

7 Claims, 8 Drawing Sheets

OPERATION FACILITY FOR UNMANNED AERIAL VEHICLE

CROSS-REFERENCE TO RELATED APPLICATION

This application claims priority to Japanese Patent Application No. 2022-142370 filed Sep. 7, 2022, the disclosure of which is hereby incorporated by reference in its entirety.

BACKGROUND OF THE INVENTION

1. Field of the Invention

The present invention relates to an operation facility for a rotary wing unmanned aerial vehicle.

2. Description of Related Art

A transport facility provided with a passage space that extends in the up-down direction is known. The reference numerals shown in parentheses in the following description of the related art are those used in Patent Document 1. JP 2009-137675A (Patent Document 1) discloses a tubular body (32) for forming an elevation passage space that spans a plurality of floors, and an elevating body (33) for transporting an article by moving up and down within the tubular body with use of an upper elevation belt (37) and a lower elevation belt (38).

Technology for transporting an article with use of a drone is also known, as described in JP 2021-020529A (Patent Document 2). However, in a transport facility such as that described above, when unmanned aerial vehicle with rotary wing ascends and descends in a passage space that extends in the up-down direction, there is a problem that the flight of the unmanned aerial vehicle may become unstable due to a difference between air pressures, which arises due to states of air conditioning or the like on respective floors, for example.

SUMMARY OF THE INVENTION

In view of this, there is desire to realize an operation facility for a rotary wing unmanned aerial vehicle that includes a passage space that makes it possible to stabilize the flight of the unmanned aerial vehicle.

An operation facility for an unmanned aerial vehicle with rotary wing, according to an aspect of the present disclosure, includes: a passage space extending in an up-down direction, and through which the unmanned aerial vehicle is capable of ascending and descending; and an air pressure control system configured to control air pressure in the passage space, wherein the air pressure control system performs control in such a manner that an air pressure above the unmanned aerial vehicle is lower than an air pressure below the unmanned aerial vehicle.

According to this configuration, the air pressure above the unmanned aerial vehicle is lower than the air pressure below the unmanned aerial vehicle, thus making it easier for the unmanned aerial vehicle to secure lift force. This therefore makes it possible to more easily stabilize the flight of the unmanned aerial vehicle. It is also possible to reduce the amount of energy consumed by the unmanned aerial vehicle in order to secure lift force, thus making it possible to more easily improve the energy efficiency of flight of the unmanned aerial vehicle.

Further features and advantages of the technology according to the present disclosure will become clearer from the following description of exemplary and non-limiting embodiments given with reference to the drawings.

DESCRIPTION OF THE INVENTION

First Embodiment

Figure 1:
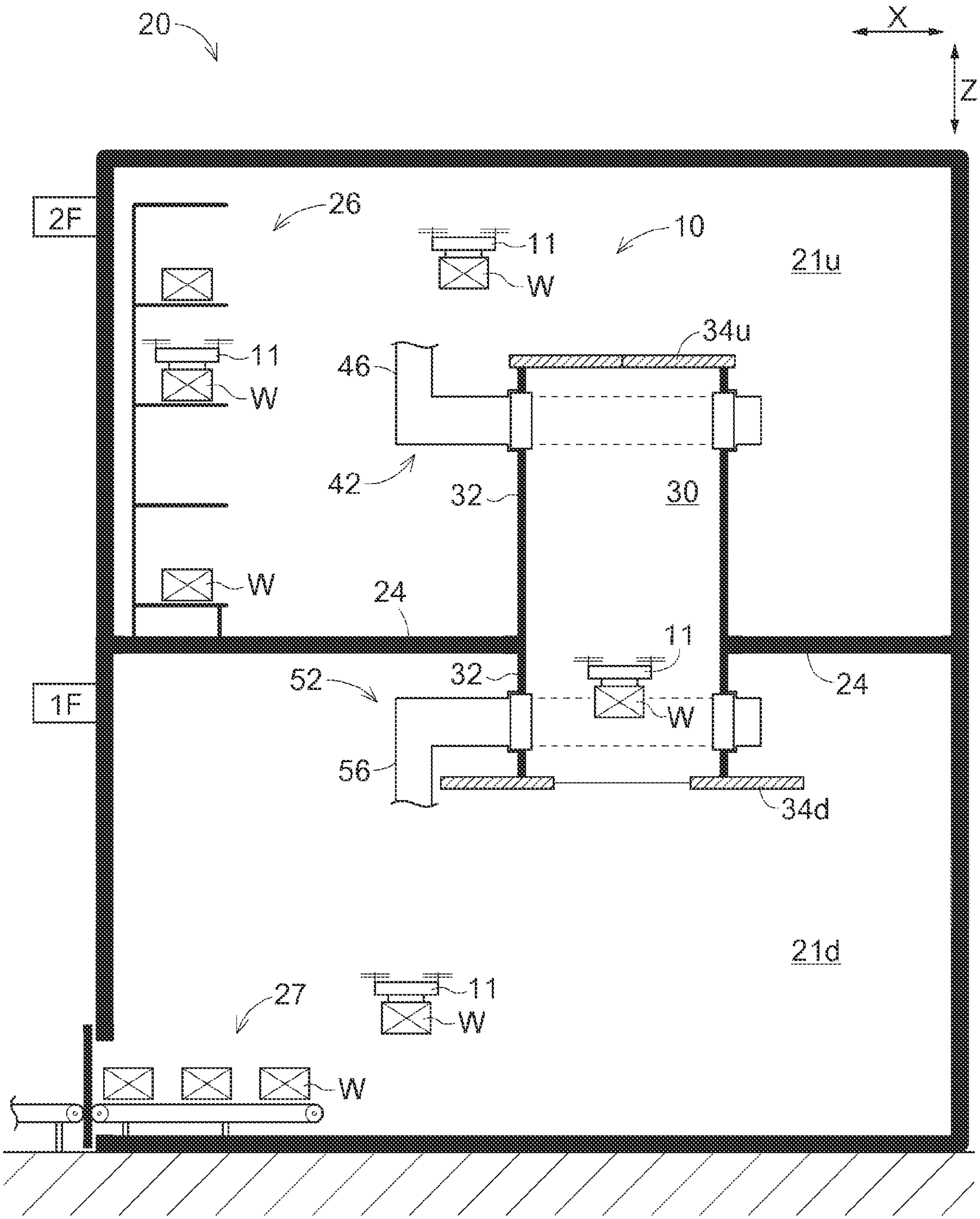
FIG. 1 is a diagram showing an operation facility for an unmanned aerial vehicle according to a first embodiment.

An operation facility 10 for an unmanned aerial vehicle 11 according to the present embodiment will be described below with reference to the drawings. FIG. 1 shows a facility 20 that includes the operation facility 10 for the unmanned aerial vehicle 11 of the present embodiment. The direction along the vertical direction will be referred to as an up-down direction Z, and the direction along the horizontal direction will be referred to as a horizontal direction X. The operation facility 10 includes a passage space 30, which extends in the up-down direction Z and is a space through which the unmanned aerial vehicle 11 ascends and descends. Here, "extends in the up-down direction Z" means that the extending direction has at least a component in the up-down direction Z. In other words, the passage space 30 need only be a space having a length in the up-down direction Z.

In the present embodiment, the unmanned aerial vehicle 11 is configured to carry an article W while flying through the passage space 30. The unmanned aerial vehicle 11 is a rotary wing aerial vehicle capable of remote control flight or autonomous flight, for example. Preferably, the unmanned aerial vehicle 11 is an electric rotary wing aircraft that includes a battery. More preferably, the unmanned aerial vehicle 11 is a rotary wing aircraft that can be charged wirelessly.

In the present embodiment, the passage space 30 is defined by a tubular wall 32 extending in the up-down direction Z. Also, in the present embodiment, the passage space 30 is disposed through a partition wall 24 between two floors (21$u$, 21$d$). In the passage space 30 defined by the tubular wall 32, the cross-section of the passage may be rectangular, or may be circular or elliptical. In the present embodiment, the tubular wall 32 has protruding portions on an upper level 21*u* side and a lower level 21*d* side. The protruding portion of the tubular wall 32 on the upper level 21*u* side also serves as a fence that prevents a worker from falling into the passage. Note that it is desirable that the tubular wall 32 does not have a protruding portion on the lower level 21*d* side.

In the present embodiment, the operation facility 10 includes doors 34*u* and 34*d* that partition the passage space 30 in the up-down direction Z. The doors 34*u* and 34*d* are opened when the unmanned aerial vehicle 11 is to pass through, and are closed after the unmanned aerial vehicle 11 passes through. In the illustrated example, the upper door 34*u* is provided in an upper portion of the passage space 30. Also, the lower door 34*d* is provided in a lower portion of the passage space 30. The lower door 34*d* also functions as a fall prevention device for preventing the unmanned aerial vehicle 11 from falling into the lower level 21*d*. In the present embodiment, the upper door 34*u* and the lower door 34*d* are each bi-parting sliding doors that open and closes in the horizontal direction X, but may also be a single sliding door, or a sliding door that opens and closes in the up-down direction Z. A double swinging door configuration is also possible.

In the present embodiment, the passage space 30 is arranged so as to pass through the partition wall 24 that partitions a plurality of floors (21*u*, 21*d*) subjected to air pressure control so as to have different atmospheric pressures from each other. In the illustrated example, the upper level 21*u* is arranged on an above ground second floor 2F, and the lower level 21*d* is arranged on an above-ground first floor 1F. The following describes an example of the case where the operation facility 10 for the unmanned aerial vehicle 11 according to the present embodiment includes the passage space 30 that is arranged so as to pass through the partition wall 24 that partitions the upper level 21*u* and the lower level 21*d*, which are two clean rooms for performing processing on articles W in a clean environment. Examples of the facility 20 that has two clean rooms as the upper level 21*u* and the lower level 21*d* include a factory for electronic parts such as semiconductors, a chemical factory, a foodstuffs factory, a warehouse, and a ship.

In the present embodiment, the upper level 21*u* includes an upper level loading section 26 where articles W can be placed. Also, the lower level 21*d* includes a lower level loading section 27 where articles W can be placed. The unmanned aerial vehicle 11 transports an article W from the upper level loading section 26 to the lower level loading section 27, or transports an article W from the lower level loading section 27 to the upper level loading section 26, for example. In the illustrated example, the upper level loading section 26 is a storage facility and the lower level loading section 27 is a conveying device, but a configuration is possible in which the upper level loading section 26 is a conveying device and the lower level loading section 27 is a storage facility. Moreover, the upper level loading section 26 and the lower level loading section 27 may both be a storage facility, a conveying device, a processing device, a table, or the like. Examples of a storage facility include a storage rack for temporarily storing articles W, a refrigerator, a freezer, and an automated warehouse equipped with a stacker crane. Examples of a conveying device include a conveyor such as a belt conveyor or a roller conveyor, an unmanned transport vehicle, and a cargo vehicle. Examples of a processing device include a processing device for chemicals, foodstuffs, or electronic parts such as semiconductors.

In the present embodiment, air pressure control is performed such that the air pressure in the upper level 21*u* is higher than the air pressure in the lower level 21*d*. In other words, the clean room in the upper level 21*u* has a higher degree of cleanliness than the clean room in the lower level 21*d*. The air pressure in the upper level 21*u* and the air pressure in the lower level 21*d* are controlled by an air conditioning system (not shown), for example. In this way, the clean room in the upper level 21*u*, which has a higher degree of cleanliness, can be made less likely to be affected by downwash that blows downward in order for flight of the rotary wing unmanned aerial vehicle 11. Preferably, an air pressure control system 40, which will be described below, controls the air pressure in the passage space 30 so as to be lower than the air pressure in the upper level 21*u*. More preferably, the below-described air pressure control system 40 controls the air pressure in the passage space 30 so as to be lower than the air pressure in the lower level 21*d*.

Figure 2:
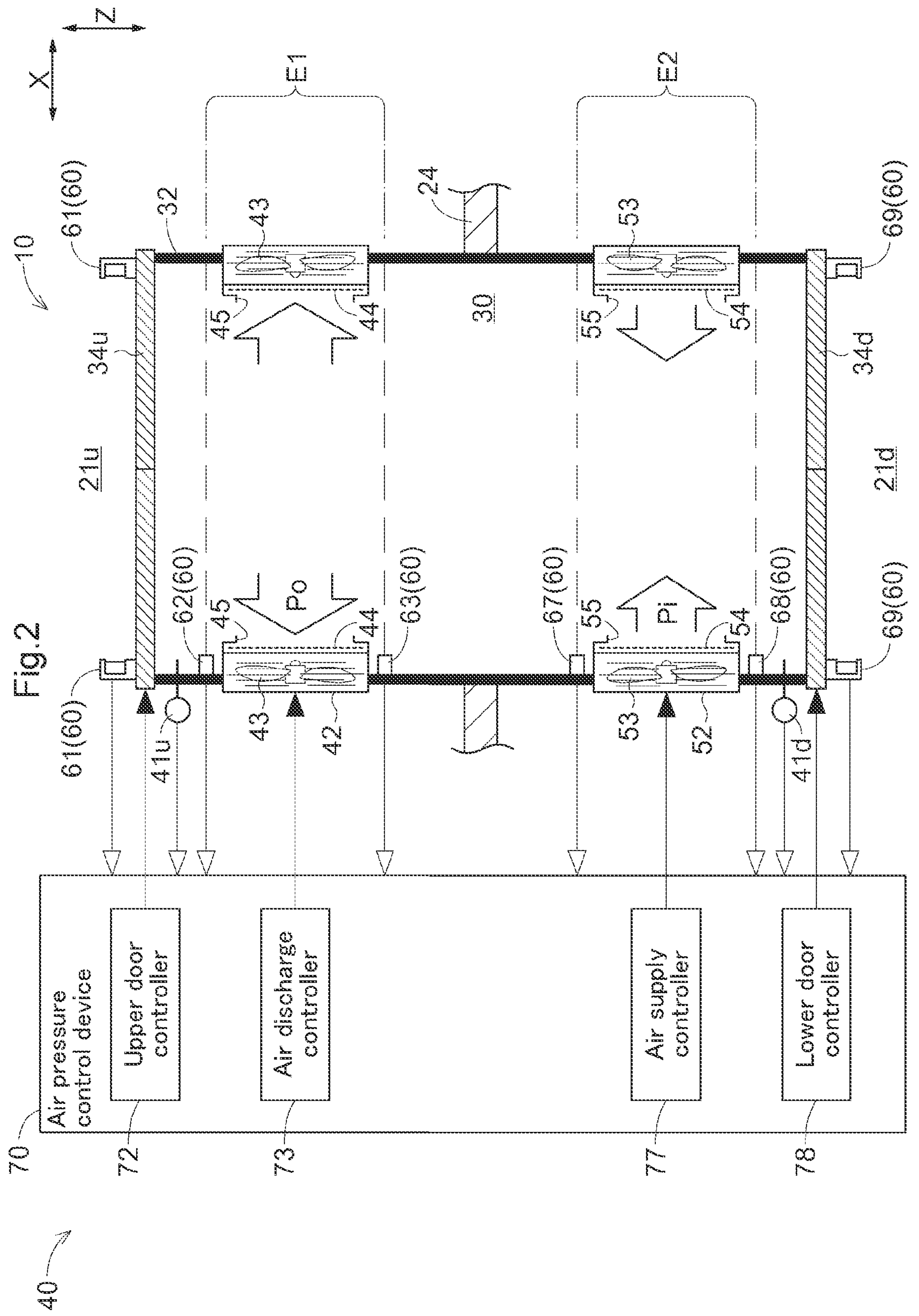
FIG. 2 is a block diagram of the operation facility of FIG. 1.

FIG. 2 shows a block diagram of the operation facility 10. The operation facility 10 includes the air pressure control system 40 that controls the air pressure in the passage space 30. In the present embodiment, the air pressure control system 40 includes air pressure detectors that detect the air pressures at respective locations arranged in the up-down direction Z in the passage space 30. In the present embodiment, an upper air pressure sensor 41*u* provided above an air discharge unit 42 and a lower air pressure sensor 41*d* provided below an air supply unit 52 function as the air pressure detectors. Various types of pressure gauges and differential pressure gauges may be used as the air pressure detectors.

In the present embodiment, the air pressure control system 40 includes the air discharge unit 42, which is provided above the passage space 30 and discharges air from the passage space 30. The air discharge unit 42 is provided so as to pass through the tubular wall 32. The air discharge unit 42 is a fan filter unit that includes a fan 43 and a filter 44. Preferably, the air discharge unit 42 includes a pair of air discharge holes 45 that face each other in the tubular wall 32, or a plurality of such pairs. In the illustrated example, the air discharge unit 42 includes a duct 46. Preferably, the air discharge unit 42 is configured such that the air discharged from the passage space 30 is discharged to the outside of the clean room via the duct 46, but may be configured such that the air discharged from the passage space 30 is discharged to the upper level 21*u*.

In the present embodiment, the air pressure control system 40 includes the air supply unit 52, which is provided below the passage space 30 and supplies air to the passage space 30. The air supply unit 52 is provided so as to pass through the tubular wall 32. The air supply unit 52 is a fan filter unit that includes a fan 53 and a filter 54. Preferably, the air supply unit 52 includes a pair of air supply holes 55 that face each other in the tubular wall 32, or a plurality of such pairs. In the illustrated example, the air supply unit 52 includes a duct 56. Preferably, the air supply unit 52 is configured to suction air with a degree of cleanliness equivalent to that of the clean room in the upper level 21*u* via the duct 56 and supply the air to the passage space 30, but may be configured to suction air from the lower level 21*d*.

In the present embodiment, the air pressure control system 40 includes a position information acquirer 60 that acquires position information indicating the positions of unmanned aerial vehicles 11. The position information acquirer 60 acquires height information or coordinate information regarding the unmanned aerial vehicles 11 as the position information indicating the positions of the unmanned aerial vehicles 11, for example. In the illustrated example, an upper door sensor 61, an air discharge-side upper sensor 62, an air discharge-side lower sensor 63, an air supply-side upper sensor 67, an air supply-side lower sensor 68, and a lower door sensor 69 function as the position information acquirer 60. These sensors may be optical sensors such as infrared sensors, or ultrasonic sensors, for example.

In the present embodiment, the air pressure control system 40 includes an air pressure control device 70 that is provided with an arithmetic processing unit such as a CPU (Central Processing Unit) and a main storage device such as a RAM (Random Access Memory) or a ROM (Read Only Memory) that can be referenced by the arithmetic processing unit. The functions of the air pressure control device 70 are realized by cooperation between hardware included in the air pressure control device 70 and a program executed on hardware such as the arithmetic processing unit. Specifically, the functions of the air pressure control device 70 are realized by the air pressure control device 70 executing a program stored in a storage device (such as the main storage device or a separately provided storage unit). In other words, a program (e.g., an air pressure control program) for causing a computer to implement the functions of the air pressure control device 70 is stored in a storage device that can be referenced by the computer. This program is provided by a storage medium or via a communication network, for example. The provided program is then stored in a storage device that can be referenced by the computer. In the present embodiment, the air pressure control device 70 (specifically, the arithmetic processing unit included in the air pressure control system 40) functions as the "computer".

In the present embodiment, the air pressure control device 70 includes an upper door controller 72 that controls the opening and closing of the upper door 34*u*, and a lower door controller 78 that controls the opening and closing of the lower door 34*d*. Preferably, the upper door controller 72 and the lower door controller 78 respectively control the upper door 34*u* and the lower door 34*d* so as to avoid the case where a plurality of unmanned aerial vehicles 11 are located in the passage space 30. For example, in the case where the air pressure control device 70 has determined, in response to the position information acquired by the position information acquirer 60, that an unmanned aerial vehicle 11 is located in the passage space 30, even if the upper door sensor 61 then detects the approach of another unmanned aerial vehicle 11, the upper door controller 72 maintains the upper door 34*u* in the closed state. As another example, in the case where the air pressure control device 70 has determined, in response to the position information acquired by the position information acquirer 60, that an unmanned aerial vehicle 11 is located in the passage space 30, even if the lower door sensor 69 then detects the approach of another unmanned aerial vehicle 11, the lower door controller 78 maintains the lower door 34*d* in the closed state.

In the present embodiment, the air pressure control system 40 performs control such that the air pressure above the unmanned aerial vehicle 11 is lower than the air pressure below the unmanned aerial vehicle 11. According to this configuration, the unmanned aerial vehicle 11 can easily secure lift force. Also, in the present embodiment, the air pressure control device 70 of the air pressure control system 40 controls the air pressure in the passage space 30 based on the position information acquired by the position information acquirer 60.

In the present embodiment, the air pressure control device 70 includes an air discharge controller 73 that controls an air discharge pressure Po of the air discharge unit 42, and an air supply controller 77 that controls an air supply pressure Pi of the air supply unit 52. Preferably, the air discharge controller 73 and the air supply controller 77 respectively control the air discharge unit 42 and the air supply unit 52 such that the air discharge pressure Po of the air discharge unit 42 is higher than or equal to the air supply pressure Pi of the air supply unit 52. According to this configuration, an ascending air current is generated in the passage space 30, and the unmanned aerial vehicle 11 can more easily secure lift force. Also, while the upper opening of the passage space 30 has been opened by the upper door 34*u*, the discharge of air from the passage space 30 to the upper level 21*u* through that opening can be easily suppressed, and while the lower opening of the passage space 30 has been opened by the lower door 34*d*, the discharge of air from the passage space 30 to the lower level 21*d* through that opening can be easily suppressed.

In the present embodiment, in the case where the air pressure control device 70 determines that an unmanned aerial vehicle 11 is to pass through the first region E1, the air discharge controller 73 sets the air discharge pressure Po of the air discharge unit 42 to a value lower than that before the determination made by the air pressure control device 70. Here, the first region E1 is a region near the air discharge unit 42 in the passage space 30. Preferably, the air pressure control device 70 determines in response to position information acquired by the position information acquirer 60 that the unmanned aerial vehicle 11 is to pass through the first region E1.

In the present embodiment, in the case where the air pressure control device 70 determines that an unmanned aerial vehicle 11 is to pass through the second region E2, the air supply controller 77 sets the air supply pressure Pi of the air supply unit 52 to a value lower than that before the determination made by the air pressure control device 70. Here, the second region E2 is a region near the air supply unit 52 in the passage space 30. Preferably, the air pressure control device 70 determines in response to the position information acquired by the position information acquirer 60 that the unmanned aerial vehicle 11 is to pass through the second region E2.

In the present embodiment, the position information acquirer 60 includes first detectors that detect the approach of an unmanned aerial vehicle 11 toward the first region E1, which is the region near the air discharge unit 42 in the passage space 30, and in the case where the unmanned aerial vehicle 11 is detected by a first detector, the air pressure control device 70 determines that the unmanned aerial vehicle 11 is to pass through the first region E1, and the air discharge controller 73 sets the air discharge pressure Po of the air discharge unit 42 to a value lower than that before the detection of the unmanned aerial vehicle 11 by the first detector. In the present embodiment, the upper door sensor 61 and the air discharge-side lower sensor 63 function as the first detectors.

In the present embodiment, the position information acquirer 60 includes second detectors that detect the approach of an unmanned aerial vehicle 11 toward the second region E2, which is the region near the air supply unit 52 in the passage space 30, and in the case where the unmanned aerial vehicle 11 is detected by a second detector, the air pressure control device 70 determines that the unmanned aerial vehicle 11 is to pass through the second region E2, and the air supply controller 77 sets the air supply pressure Pi of the air supply unit 52 to a value lower than that before the detection of the unmanned aerial vehicle 11 by the second detector. In the present embodiment, the lower door sensor 69 and the air supply-side upper sensor 67 function as the second detectors.

In the present embodiment, in the case where an unmanned aerial vehicle 11 is to pass through the first region E1, which is the region in the up-down direction Z where the air discharge unit 42 is arranged in the passage space 30, the air pressure control system 40 sets the air discharge pressure Po of the air discharge unit 42 to a value lower than that before entrance of the unmanned aerial vehicle 11 into the first region E1. Also, in the present embodiment, the air pressure control system 40 includes the first detectors (upper door sensor 61, air discharge-side lower sensor 63) that detect the approach of an unmanned aerial vehicle 11 toward the first region E1, and a case where an unmanned aerial vehicle 11 is detected by a first detector is determined to be a case where an unmanned aerial vehicle 11 is to pass through the first region E1. According to this configuration, in the case where an unmanned aerial vehicle 11 is to pass through the first region E1, the flight of the unmanned aerial vehicle 11 can be easily stabilized. Also, it is possible to appropriately determine a case where an unmanned aerial vehicle 11 is to pass through the first region E1. In the illustrated example, the first region E1 includes a region in the up-down direction Z where the air discharge holes 45 of the air discharge unit 42 are arranged.

In the present embodiment, in the case where an unmanned aerial vehicle 11 is to pass through the second region E2, which is the region in the up-down direction Z where the air supply unit 52 is arranged in the passage space 30, the air pressure control system 40 sets the air supply pressure Pi of the air supply unit 52 to a value lower than that before entrance of the unmanned aerial vehicle 11 into the second region E2. Also, in the present embodiment, the air pressure control system 40 includes the second detectors (lower door sensor 69, air supply-side upper sensor 67) that detect the approach of an unmanned aerial vehicle 11 toward the second region E2, and a case where an unmanned aerial vehicle 11 is detected by a second detector is determined to be a case where an unmanned aerial vehicle 11 is to pass through the second region E2. According to this configuration, in the case where an unmanned aerial vehicle 11 is to pass through the second region E2, the flight of the unmanned aerial vehicle 11 can be easily stabilized. Also, it is possible to appropriately determine a case where an unmanned aerial vehicle 11 is to pass through the second region E2. In the illustrated example, the second region E2 includes a region in the up-down direction Z where the air supply holes 55 of the air supply unit 52 are arranged.

In the present embodiment, the air pressure control system 40 controls the air pressure in the passage space 30 based on position information acquired by the position information acquirer 60 and detection results (air pressures) from the air pressure detectors (41*u*, 41*d*). According to this configuration, control for setting the air pressure above the unmanned aerial vehicle 11 to a value lower than the air pressure below the unmanned aerial vehicle 11 can be appropriately performed in accordance with the position of the unmanned aerial vehicle 11.

Figure 3:
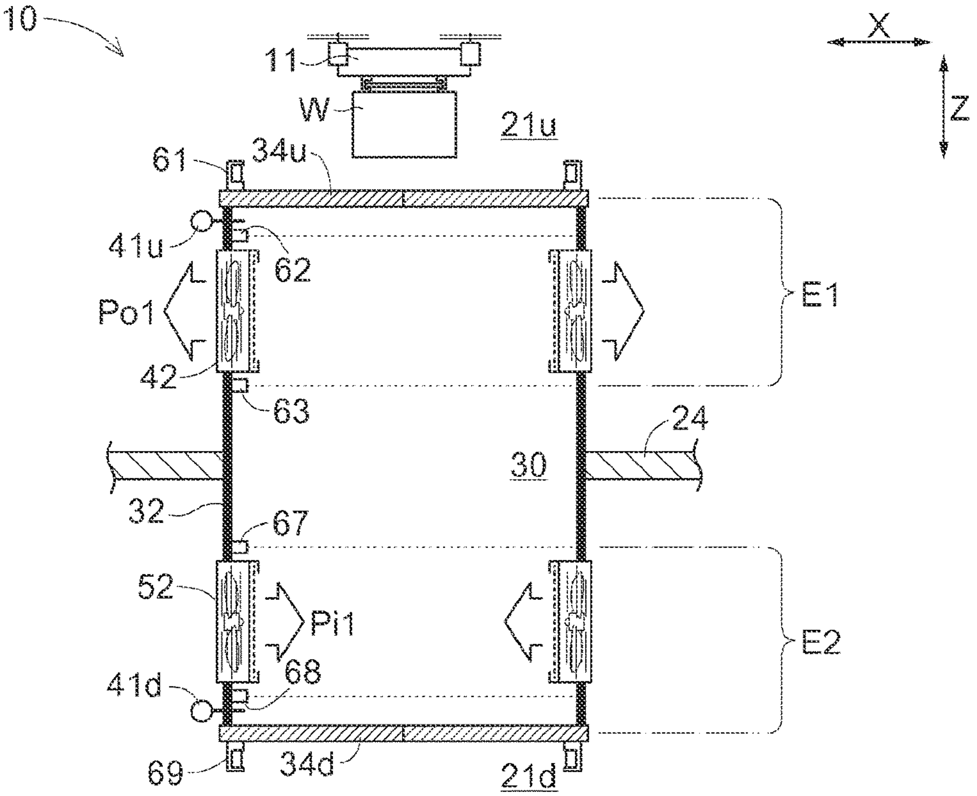
FIG. 3 is a diagram showing a state in which an unmanned aerial vehicle in the operation facility of FIG. 2 is located outside an upper door.

An example of control of the air pressure in the passage space 30 performed by the air pressure control system 40 when an unmanned aerial vehicle 11 descends will be described below with reference to FIGS. 3 to 7. FIG. 3 shows a state in which the upper door 34*u* and the lower door 34*d* are closed, and an unmanned aerial vehicle 11 is located outside the upper door 34*u*. The air discharge pressure Po of the air discharge unit 42 in this state will be referred to as a first air discharge pressure Po1, and the air supply pressure Pi of the air supply unit 52 in this state will be referred to as a first air supply pressure Pi1.

Figure 4:
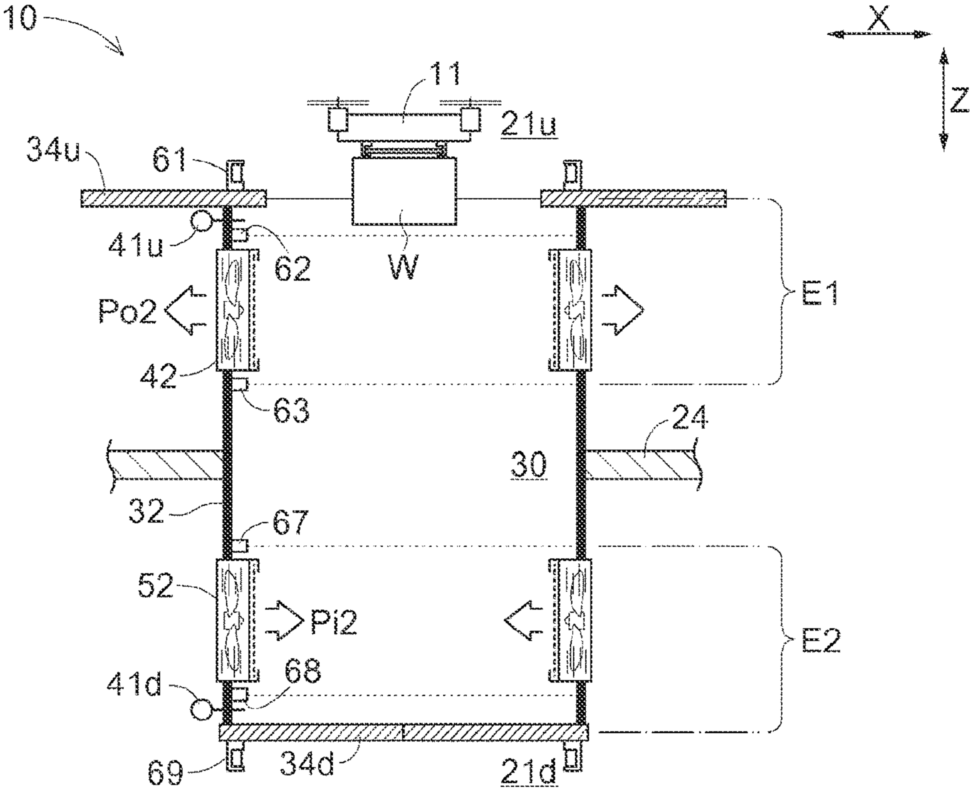
FIG. 4 is a diagram showing a state in which the upper door is open in the operation facility of FIG. 2.

In the case where the position information acquirer 60 detects the approach of the unmanned aerial vehicle 11 toward the first region E1 outside the passage space 30, that is to say in the case where the upper door sensor 61 detects the unmanned aerial vehicle 11, the air discharge controller 73 of the air pressure control device 70 sets the air discharge pressure Po of the air discharge unit 42 to a second air discharge pressure Po2 that is lower than the first air discharge pressure Po1. Also, the air supply controller 77 of the air pressure control device 70 sets the air supply pressure Pi of the air supply unit 52 to a second air supply pressure Pi2 that is lower than the first air supply pressure Pi1. Next, the upper door controller 72 of the air pressure control device 70 opens the upper door 34*u*. FIG. 4 shows the state after the upper door 34*u* is opened. Downward force is generated by an air pressure difference when the upper door 34*u* is opened, and downward force is generated by the discharge of air by the air discharge unit 42, but according to the above configuration, it is possible to reduce the effect of such downward force on the unmanned aerial vehicle 11 located above the upper door 34*u*. Also, even if the unmanned aerial vehicle 11 loses lift force, upward force that acts on the unmanned aerial vehicle 11 is generated by the discharge of air by the air discharge unit 42 and the supply of air by the air supply unit 52, thus allowing the unmanned aerial vehicle 11 to easily restore lift force between the air discharge unit 42 and the air supply unit 52.

When the unmanned aerial vehicle 11 descends from the state shown in FIG. 4 and the unmanned aerial vehicle 11 is detected by the air discharge-side lower sensor 63, the upper door controller 72 closes the upper door 34*u*. Next, the air discharge controller 73 sets the air discharge pressure Po of the air discharge unit 42 to a third air discharge pressure Po3 that is higher than the second air discharge pressure Po2. Also, the air supply controller 77 sets the air supply pressure Pi of the air supply unit 52 to a third air supply pressure Pi3 that is higher than the second air supply pressure Pi2.

Figure 5:
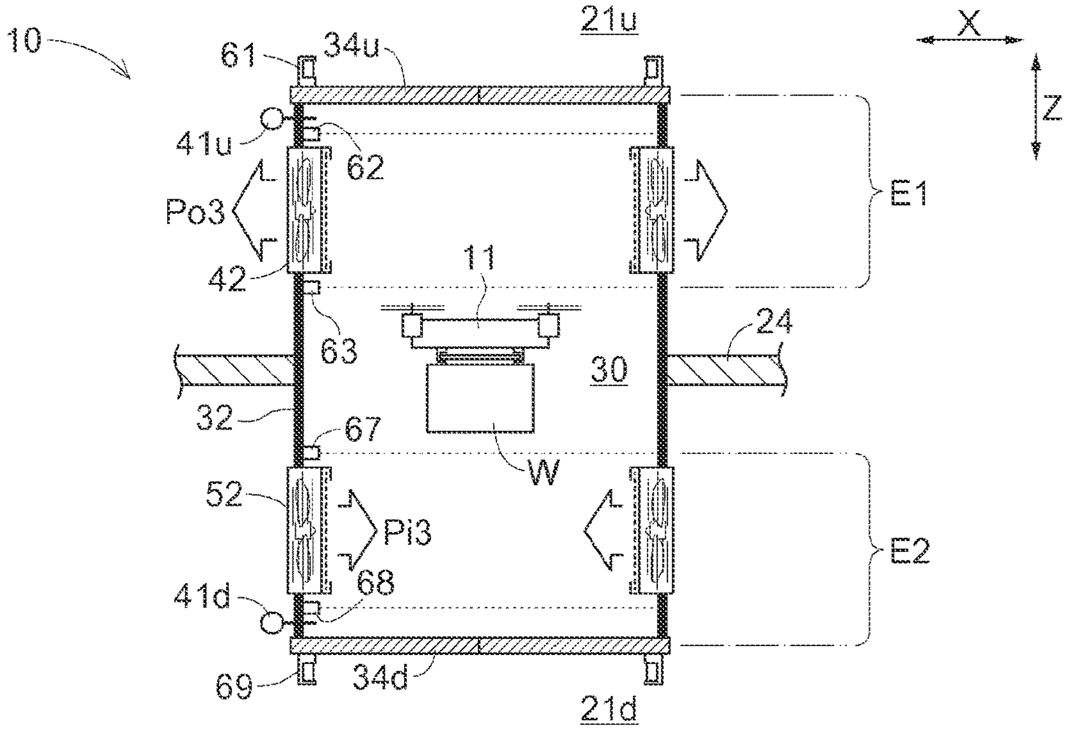
FIG. 5 is a diagram showing a state in which an unmanned aerial vehicle in the operation facility of FIG. 2 is located between a first region and a second region.

FIG. 5 shows a state in which the unmanned aerial vehicle 11 has descended further and is located at a position below the air discharge-side lower sensor 63 but above the air supply-side upper sensor 67. In the state shown in FIG. 5, the air discharge-side lower sensor 63 and the air supply-side upper sensor 67 have not detected the unmanned aerial vehicle 11.

When the unmanned aerial vehicle 11 descends from the state shown in FIG. 5 and the unmanned aerial vehicle 11 is detected by the air supply-side upper sensor 67, the air discharge controller 73 sets the air discharge pressure Po of the air discharge unit 42 to a fourth air discharge pressure Po4 that is lower than the third air discharge pressure Po3. Also, the air supply controller 77 sets the air supply pressure Pi of the air supply unit 52 to a fourth air supply pressure Pi4 that is lower than the third air supply pressure Pi3. Preferably, the fourth air supply pressure Pi4 is zero.

Figure 6:
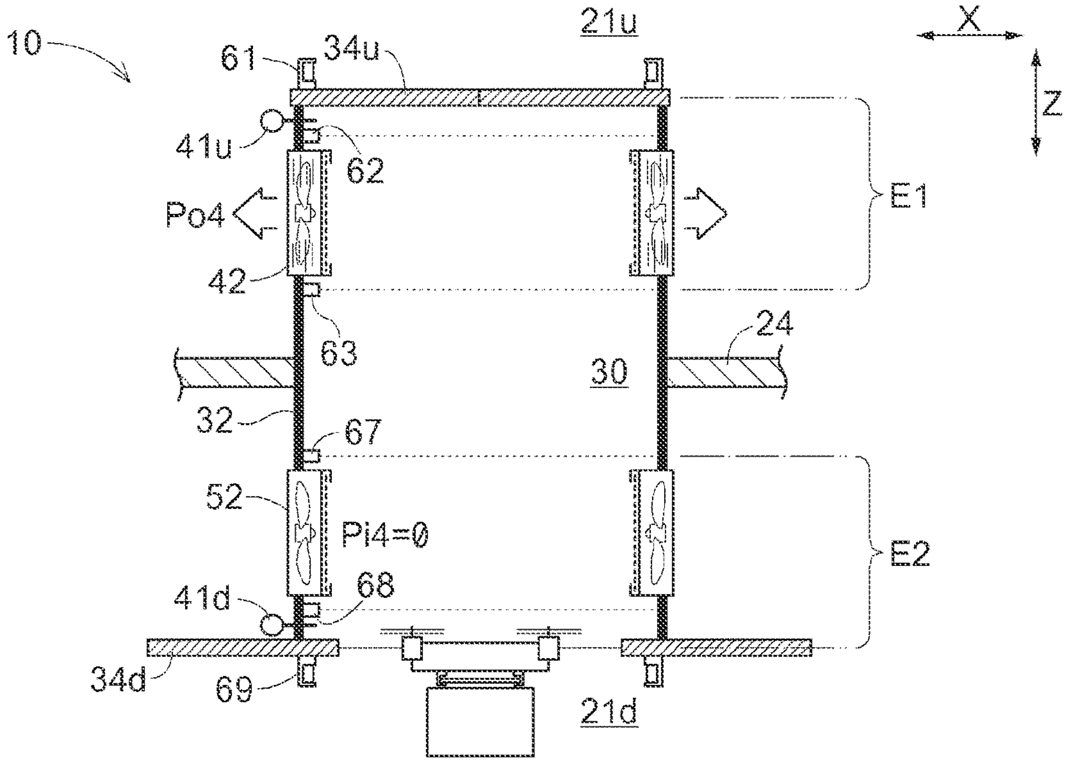
FIG. 6 is a diagram showing a state in which a lower door is open in the operation facility of FIG. 2.

In the case where the unmanned aerial vehicle 11 descends further and the unmanned aerial vehicle 11 is detected by the air supply-side lower sensor 68, the lower door controller 78 opens the lower door 34*d*. FIG. 6 shows the state after the lower door 34*d* is opened. According to this configuration, in the case where the unmanned aerial vehicle 11 is located below the air supply unit 52, it is possible to reduce the effect that downward force generated by the supply of air by the air supply unit 52 has on the unmanned aerial vehicle 11. Also, the air in the passage space 30 can more easily flow toward the air discharge unit 42, and the flow of such air out from the lower door 34*d* can be suppressed. Note that after the lower door 34*d* is opened, the fourth air discharge pressure Po4 may be set the same as the third air discharge pressure Po3 or higher than the third air discharge pressure Po3.

Figure 7:
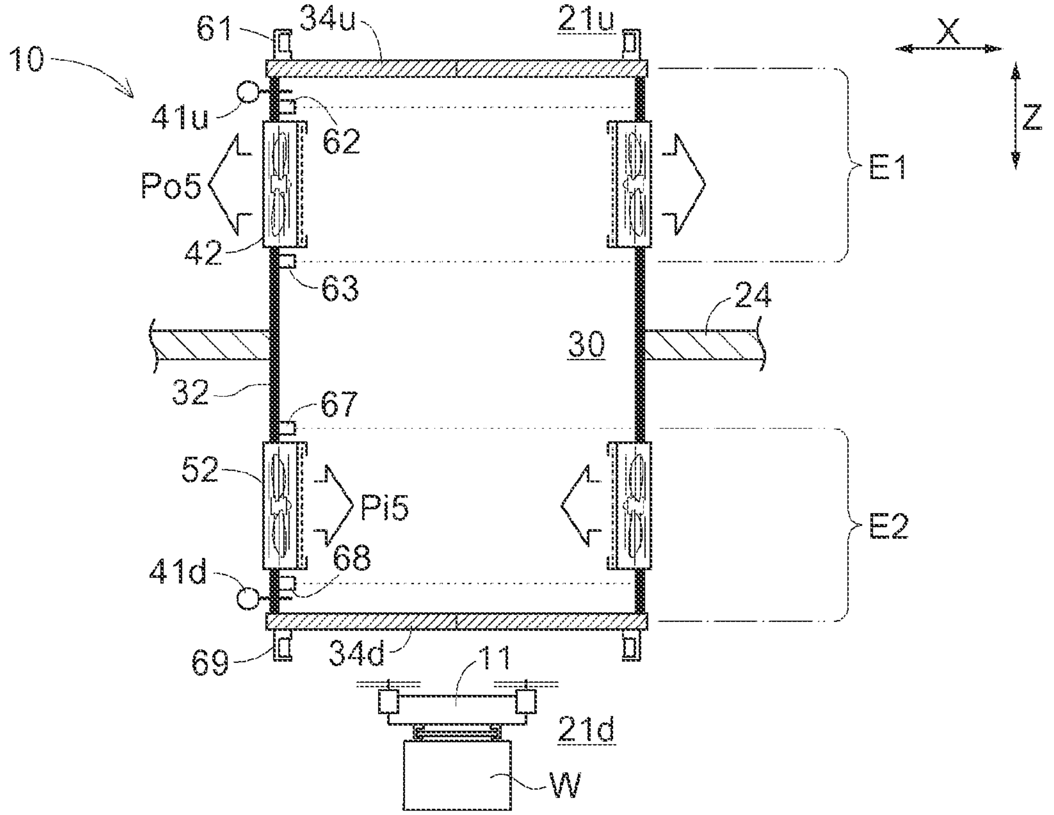
FIG. 7 is a diagram showing a state in which an unmanned aerial vehicle in the operation facility of FIG. 2 is located outside the lower door.

When the unmanned aerial vehicle 11 descends from the state shown in FIG. 6 and the unmanned aerial vehicle 11 is detected by the lower door sensor 69, the lower door controller 78 closes the lower door 34*d*. Next, the air discharge controller 73 sets the air discharge pressure Po of the air discharge unit 42 to a fifth air discharge pressure Po5 that is higher than the fourth air discharge pressure Po4. Also, the air supply controller 77 sets the air supply pressure Pi of the air supply unit 52 to a fifth air supply pressure Pi5 that is higher than the fourth air supply pressure Pi4. FIG. 7 shows a state in which the upper door 34*u* and the lower door 34*d* are closed, and the unmanned aerial vehicle 11 is located outside the lower door 34*d*.

Next, an example of control of the air pressure in the passage space 30 performed by the air pressure control system 40 when an unmanned aerial vehicle 11 ascends will be described with reference to FIGS. 7 to 3 in that order. FIG. 7 shows a state in which the ascending unmanned aerial vehicle 11 is located outside the lower door 34*d*.

In the case where the position information acquirer 60 detects the approach of the unmanned aerial vehicle 11 toward the second region E2 outside the passage space 30, that is to say in the case where the lower door sensor 69 detects the unmanned aerial vehicle 11, the air discharge controller 73 of the air pressure control device 70 sets the air discharge pressure Po of the air discharge unit 42 to the fourth air discharge pressure Po4 that is lower than the fifth air discharge pressure Po5. Also, the air supply controller 77 of the air pressure control device 70 sets the air supply pressure Pi of the air supply unit 52 to the fourth air supply pressure Pi4 that is lower than the fifth air supply pressure Pi5. Preferably, the fourth air supply pressure Pi4 is zero. Next, the lower door controller 78 of the air pressure control device 70 opens the lower door 34*d*. FIG. 6 shows the state after the lower door 34*d* is opened. According to this configuration, it is possible to reduce the effect that downward force generated by the supply of air by the air supply unit 52 has on the unmanned aerial vehicle 11 located below the air supply unit 52. Also, the air in the passage space 30 can more easily flow toward the air discharge unit 42, and the flow of such air out from the lower door 34*d* can be suppressed.

When the unmanned aerial vehicle 11 ascends from the state shown in FIG. 6 and the air supply-side upper sensor 67 detects the unmanned aerial vehicle 11, the lower door controller 78 closes the lower door 34*d*. Next, the air discharge controller 73 sets the air discharge pressure Po of the air discharge unit 42 to the third air discharge pressure Po3 that is higher than the fourth air discharge pressure Po4. Also, the air supply controller 77 sets the air supply pressure Pi of the air supply unit 52 to the third air supply pressure Pi3 that is higher than the fourth air supply pressure Pi4.

FIG. 5 shows a state in which the unmanned aerial vehicle 11 has ascended further and is located at a position above the air supply-side upper sensor 67 but below the air discharge-side lower sensor 63. In the state shown in FIG. 5, the air supply-side upper sensor 67 and the air discharge-side lower sensor 63 have not detected the unmanned aerial vehicle 11.

When the unmanned aerial vehicle 11 ascends from the state shown in FIG. 5 and the unmanned aerial vehicle 11 is detected by the air discharge-side lower sensor 63, the air discharge controller 73 sets the air discharge pressure Po of the air discharge unit 42 to the second air discharge pressure Po2 that is lower than the third air discharge pressure Po3. Also, the air supply controller 77 sets the air supply pressure Pi of the air supply unit 52 to the second air supply pressure Pi2 that is lower than the third air supply pressure Pi3.

When the unmanned aerial vehicle 11 ascends further and the unmanned aerial vehicle 11 is detected by the air discharge-side upper sensor 62, the upper door controller 72 opens the upper door 34*u*. FIG. 4 shows the state after the upper door 34*u* is opened. According to this configuration, in the case where the unmanned aerial vehicle 11 is located above the air discharge unit 42, it is possible to reduce the effect that downward force generated by the discharge of air by the air discharge unit 42 has on the unmanned aerial vehicle 11.

When the unmanned aerial vehicle 11 ascends from the state shown in FIG. 4 and the upper door sensor 61 detects the unmanned aerial vehicle 11, the upper door controller 72 closes the upper door 34*u*. Next, the air discharge controller 73 sets the air discharge pressure Po of the air discharge unit 42 to the first air discharge pressure Po1 that is higher than the second air discharge pressure Po2. Also, the air supply controller 77 sets the air supply pressure Pi of the air supply unit 52 to the first air supply pressure Pi1 that is higher than the second air supply pressure Pi2. FIG. 3 shows a state in which the upper door 34*u* and the lower door 34*d* are closed, and the unmanned aerial vehicle 11 is located outside the upper door 34*u*.

In the present embodiment, the first air discharge pressure Po1, the third air discharge pressure Po3, and the fifth air discharge pressure Po5 are the same value, but they may be different from each other. Also, in the present embodiment, the second air discharge pressure Po2 and the fourth air discharge pressure Po4 are the same value, but they may be different from each other. Moreover, in the present embodiment, the first air supply pressure Pi1, the third air supply pressure Pi3, and the fifth air supply pressure Pi5 are the same value, but they may be different.

In the present embodiment, the fourth air discharge pressure Po4 may be the same value as the third air discharge pressure Po3 or the same value as the fifth air supply pressure Pi5. Also, in the present embodiment, the fourth air discharge pressure Po4 may be higher than the third air discharge pressure Po3 or the fifth air supply pressure Pi5. According to this configuration, the unmanned aerial vehicle 11 can more easily secure lift force when located near the air supply unit 52.

Preferably, the first air discharge pressure Po1, the second air discharge pressure Po2, the third air discharge pressure Po3, the fourth air discharge pressure Po4, and the fifth air discharge pressure Po5 are respectively higher than the first air supply pressure Pi1, the second air supply pressure Pi2, the third air supply pressure Pi3, the fourth air supply pressure Pi4, and the fifth air supply pressure Pi5. According to this configuration, it is possible to more easily perform control such that the air pressure above the unmanned aerial vehicle 11 is lower than the air pressure below the unmanned aerial vehicle 11.

Also, preferably, the second air discharge pressure Po2, the third air discharge pressure Po3, and the fourth air discharge pressure Po4 in the case where the unmanned aerial vehicle 11 ascends are respectively higher than the second air discharge pressure Po2, the third air discharge pressure Po3, and the fourth air discharge pressure Po4 in the case where the unmanned aerial vehicle 11 descends. According to this configuration, the energy consumption of the unmanned aerial vehicle 11 can be further reduced when the unmanned aerial vehicle 11 ascends.

Also, preferably, the air pressure control device 70 of the air pressure control system 40 determines the air discharge pressures Po (e.g., the first air discharge pressure Po1, the second air discharge pressure Po2, the third air discharge pressure Po3, the fourth air discharge pressure Po4, and the fifth air discharge pressure Po5) and the air supply pressures Pi (e.g., the first air supply pressure Pi1, the second air supply pressure Pi2, the third air supply pressure Pi3, the fourth air supply pressure Pi4, and the fifth air supply pressure Pi5) such that the air pressure above the unmanned aerial vehicle 11 (e.g., the air pressure detected by the upper air pressure sensor 41*u*) is lower than the air pressure below the unmanned aerial vehicle 11 (e.g., the air pressure detected by the lower air pressure sensor 41*d*), based on position information acquired by the position information acquirer 60 and detection results (air pressures) from the air pressure detectors (41*u*, 41*d*).

In the present embodiment, the passage space 30 is shaped as a column that extends in the up-down direction Z. It is desirable that in the case where the unmanned aerial vehicle 11 descends in the passage space 30, the unmanned aerial vehicle 11 draws a spiral path while descending. According to this configuration, it is possible to avoid a vortex ring state when the unmanned aerial vehicle 11 descends.

Second Embodiment

Figure 8:
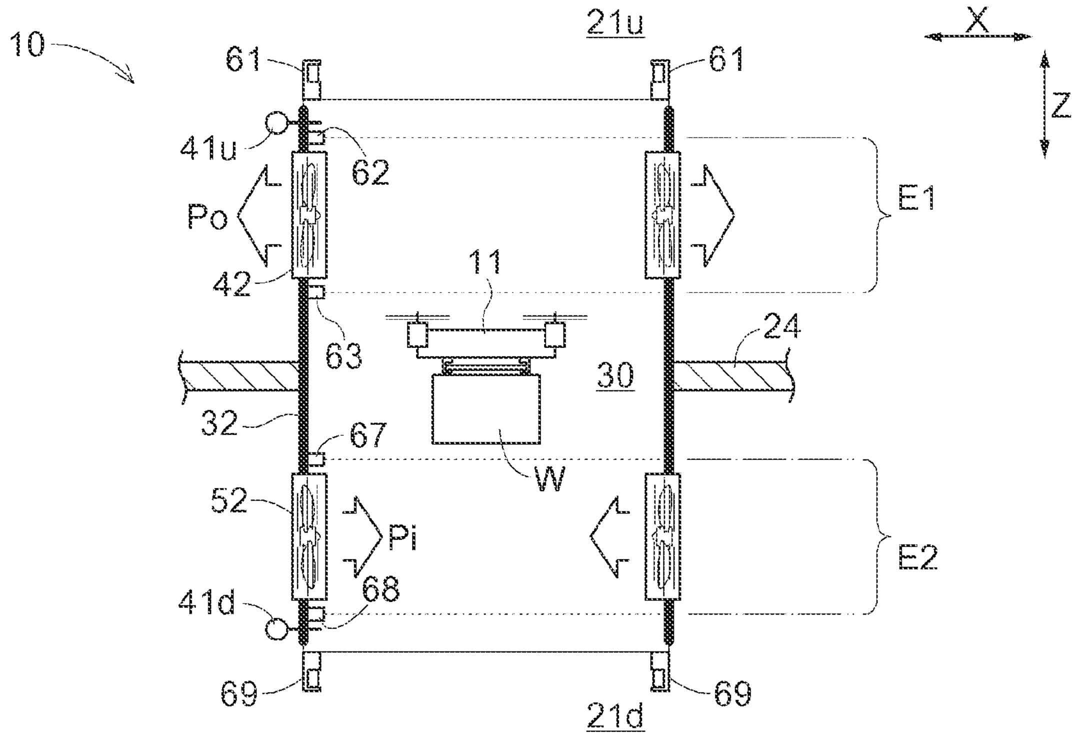
FIG. 8 is a diagram showing an operation facility for an unmanned aerial vehicle according to a second embodiment.

Hereinafter, the operation facility 10 for an unmanned aerial vehicle 11 according to a second embodiment will be described with reference to the drawings. FIG. 8 is a diagram showing the operation facility 10 of the present embodiment. The present embodiment is different from the first embodiment in that the upper level 21*u* and the lower level 21*d* are not clean rooms, and that the operation facility 10 does not include the upper door 34*u*, the upper door sensor 61, the upper door controller 72, the lower door 34*d*, the lower door sensor 69, the lower door controller 78, the filter 44 of the air discharge unit 42, and the filter 54 of the air supply unit 52. The following description focuses on differences from the first embodiment. Note that points not particularly described below may be deemed to be similar to the first embodiment. It should also be noted that the air pressure control device 70 is not shown in FIG. 8.

In the present embodiment, the air discharge-side upper sensor 62 is configured to detect an unmanned aerial vehicle 11 that is located at the upper limit of the first region E1. Also, the air discharge-side lower sensor 63 is configured to detect an unmanned aerial vehicle 11 that is located at the lower limit of the first region E1. The air discharge-side upper sensor 62 and the air discharge-side lower sensor 63 function as the first detectors that detect the approach of the unmanned aerial vehicle 11 toward the first region E1, and a case where an unmanned aerial vehicle 11 is detected by a first detector is determined to be a case where an unmanned aerial vehicle 11 is to pass through the first region E1.

In the present embodiment, the air supply-side upper sensor 67 is configured to detect an unmanned aerial vehicle 11 that is located at the upper limit of the second region E2. Also, the air supply-side lower sensor 68 is configured to detect an unmanned aerial vehicle 11 that is located at the lower limit of the second region E2. The air supply-side upper sensor 67 and the air supply-side lower sensor 68 function as the second detectors that detect the approach of the unmanned aerial vehicle 11 toward the second region E2, and a case where an unmanned aerial vehicle 11 is detected by a second detector is determined to be a case where an unmanned aerial vehicle 11 is to pass through the second region E2.

Third Embodiment

Figure 9:
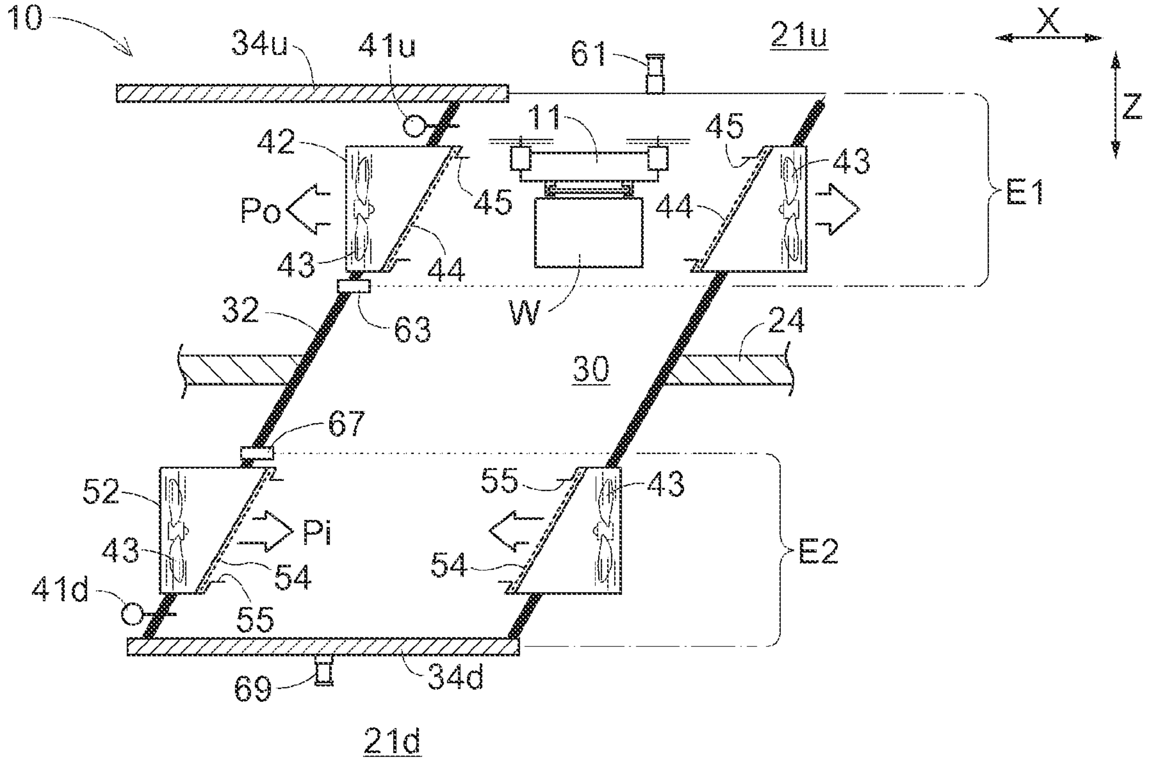
FIG. 9 is a diagram showing an operation facility for an unmanned aerial vehicle according to a third embodiment.

Hereinafter, the operation facility 10 for an unmanned aerial vehicle 11 according to a third embodiment will be described with reference to the drawings. FIG. 9 is a diagram showing the operation facility 10 of the present embodiment. The following description focuses on differences from the first embodiment. Note that points not particularly described below may be deemed to be similar to the first embodiment. It should also be noted that the air pressure control device 70 is not shown in FIG. 9.

In the present embodiment, the passage space 30 is shaped as a column that is inclined to a side in the horizontal direction X. Also, in the present embodiment, the upper door 34*u* and the lower door 34*d* are each a single door. The upper door 34*u* is a sliding door that is opened by being pulled to one side in the horizontal direction X. The lower door 34*d* is a sliding door that is opened by being pulled to the other side in the horizontal direction X.

Fourth Embodiment

Figure 10:
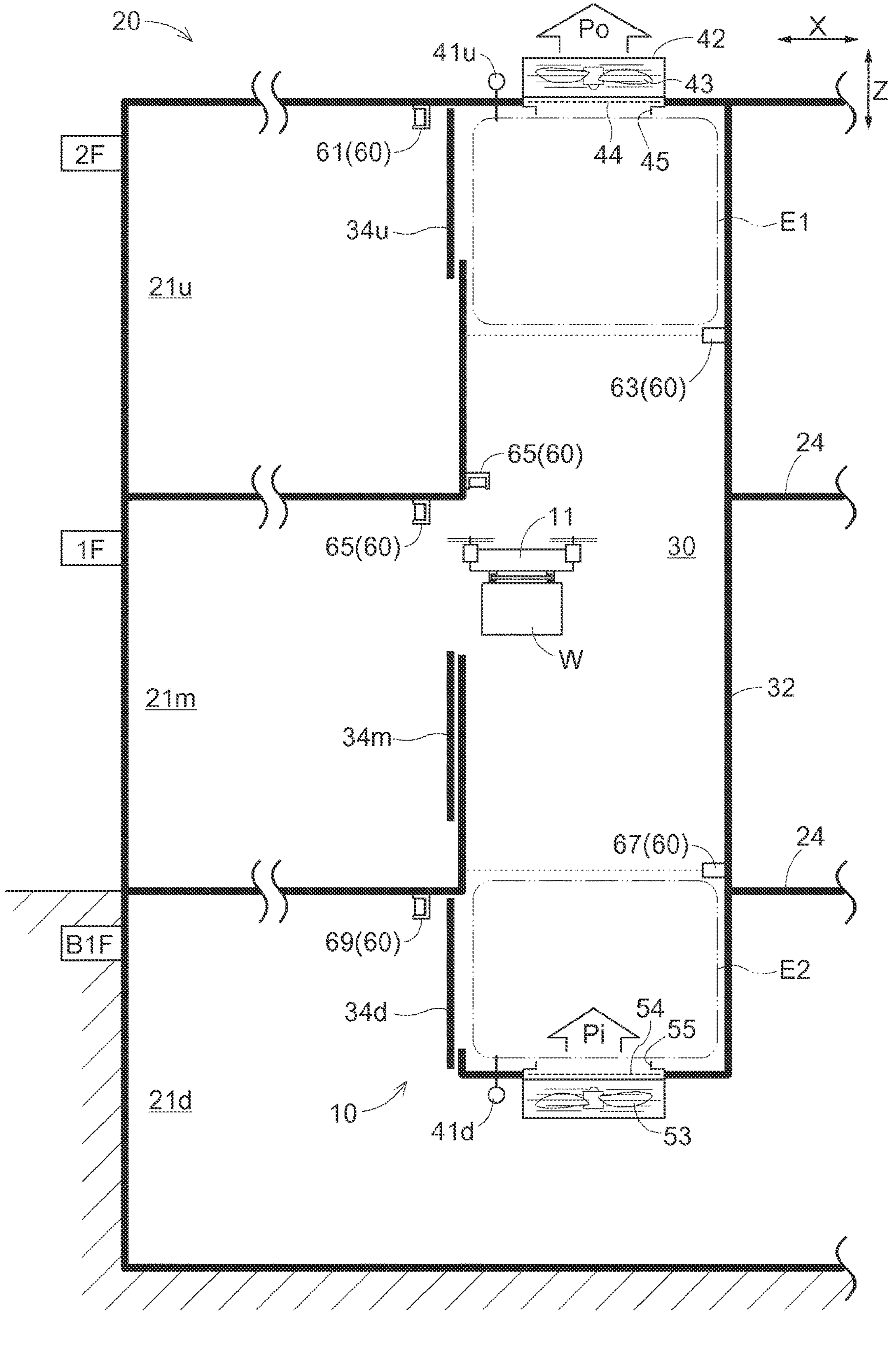
FIG. 10 is a diagram showing an operation facility for an unmanned aerial vehicle according to a fourth embodiment.

Hereinafter, the operation facility 10 for an unmanned aerial vehicle 11 according to a fourth embodiment will be described with reference to the drawings. FIG. 10 is a diagram showing the operation facility 10 of the present embodiment. The following description focuses on differences from the first embodiment. Note that points not particularly described below may be deemed to be similar to the first embodiment. It should also be noted that the air pressure control device 70 is not shown in FIG. 10.

In the present embodiment, the passage space 30 is defined by the tubular wall 32 extending in the up-down direction Z, and disposed through partition walls 24 each of which is disposed between two adjacent levels of three levels, namely the upper level 21*u*, a middle level 21*m*, and the lower level 21*d*. In the illustrated example, the upper level 21*u* is arranged on the above-ground second floor, the middle level 21*m* is arranged on the above-ground first floor, and the lower level 21*d* is arranged on the below-ground first floor.

In the present embodiment, the air discharge unit 42 includes an air discharge hole 45 for discharging air upward from the passage space 30, in a ceiling portion of the passage space 30. Also, the air supply unit 52 includes an air supply hole 55 for supplying air upward to the passage space 30, in a bottom portion of the passage space 30. In the present embodiment, the first region E1, which is the region near the air discharge unit 42 in the passage space 30, is a region whose upper limit is the ceiling portion of the passage space 30 and whose lower limit is the air discharge-side lower sensor 63. The second region E2, which is the region near the air supply unit 52 in the passage space 30, is a region whose upper limit is the air supply-side upper sensor 67 and whose lower limit is the bottom portion of the passage space

30. In the present embodiment, the air discharge-side upper sensor 62 and the air supply-side lower sensor 68 are not provided.

In the present embodiment, the operation facility 10 includes a middle door 34*m* for movement of an unmanned aerial vehicle 11 between the passage space 30 and the middle level 21*m*. Also, although not shown, the air pressure control device 70 includes a middle door controller that controls the opening and closing of the middle door 34*m*. In the present embodiment, in the case where the air pressure control device 70 determines, in response to position information acquired by the position information acquirer 60, that an unmanned aerial vehicle 11 is to pass through the middle door 34*m*, the middle door controller of the air pressure control device 70 opens and closes the middle door 34*m*. In the illustrated example, the position information acquirer 60 includes a middle door sensor 65 that functions as a third detector that detects the approach of the unmanned aerial vehicle 11 toward the middle door 34*m*.

Preferably, in the case where the air pressure control device 70 determines that an unmanned aerial vehicle 11 is to pass through the middle door 34*m*, the air discharge controller 73 sets the air discharge pressure Po of the air discharge unit 42 to a value lower than that before the determination was made. Also, in the case where the air pressure control device 70 determines that the unmanned aerial vehicle 11 is to pass through the middle door 34*m*, the air supply controller 77 sets the air supply pressure Pi of the air supply unit 52 to a value lower than that before the determination was made. According to this configuration, in the case where an unmanned aerial vehicle 11 is to pass through the middle door 34*m* as well, the flight of the unmanned aerial vehicle 11 can be easily stabilized. More preferably, the air pressure control device 70 determines, in response to position information acquired by the position information acquirer 60, that the unmanned aerial vehicle 11 is to pass through the middle door 34*m*.

Fifth Embodiment

Figure 11:
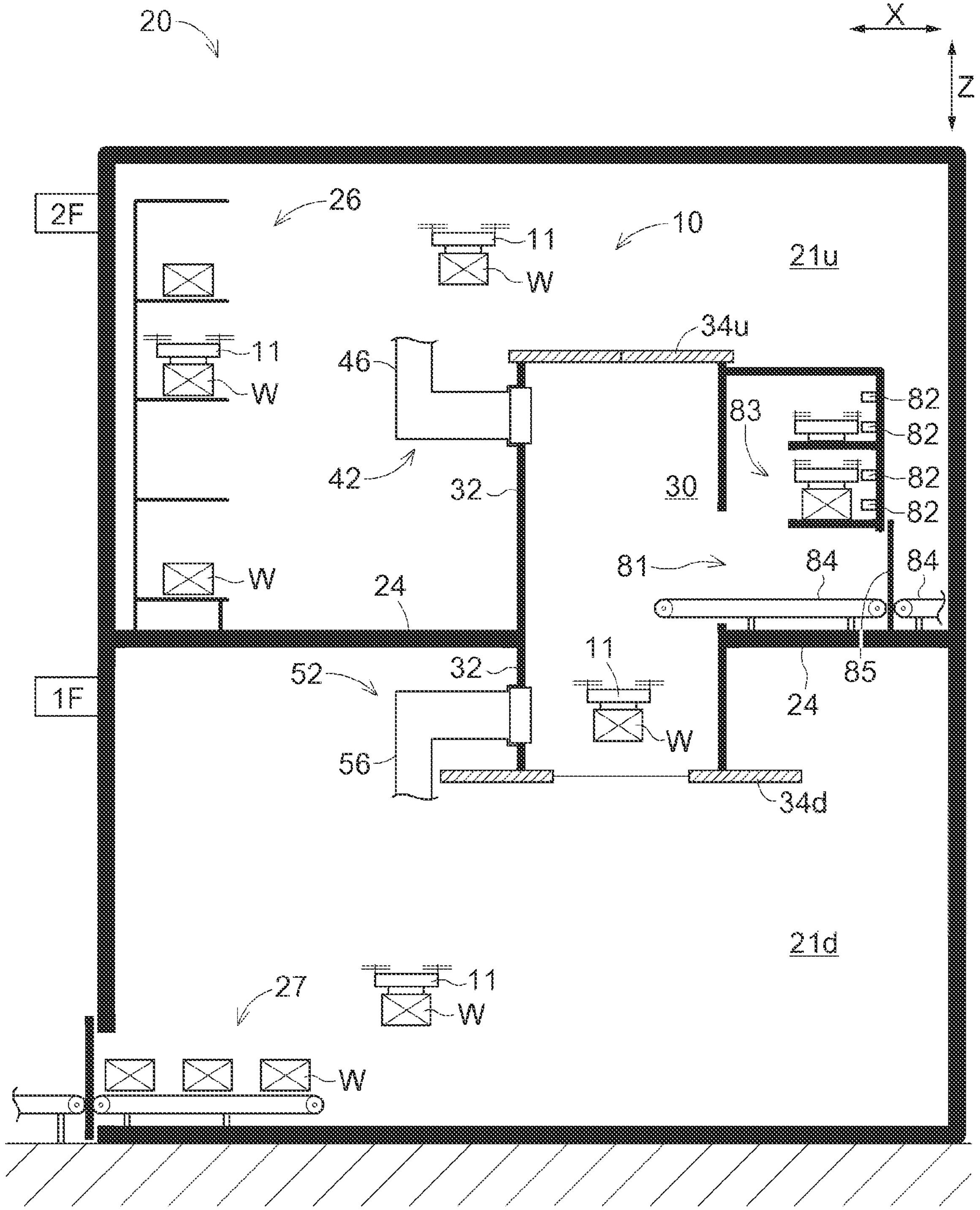
FIG. 11 is a diagram showing an operation facility for an unmanned aerial vehicle according to a fifth embodiment.

Hereinafter, the operation facility 10 for an unmanned aerial vehicle 11 according to a fifth embodiment will be described with reference to the drawings. FIG. 11 is a diagram showing the operation facility 10 of the present embodiment. The following description focuses on differences from the first embodiment. Note that points not particularly described below may be deemed to be similar to the first embodiment. It should also be noted that the air pressure control device 70 is not shown in FIG. 11.

In the present embodiment, the operation facility 10 further includes a conveying port 81 at which unmanned aerial vehicles 11 can take off and land, and at which articles W can be delivered and received. This conveying port 81 is arranged at a position connected to the passage space 30. Accordingly, an unmanned aerial vehicle 11 can be caused to land at the conveying port 81 in order to perform maintenance, charging, or the like for the unmanned aerial vehicle 11. In the present embodiment, the conveying port 81 includes a plurality of wireless charging devices 82. The charging devices 82 are each configured to be able to charge an unmanned aerial vehicle 11 in both a state of holding an article W and a state of not holding an article W. Also, the conveying port 81 includes a storage rack 83 for storing unmanned aerial vehicles 11.

In the present embodiment, the operation facility 10 includes a conveying device 84 capable of transporting unmanned aerial vehicles 11 and articles W between the conveying port 81 and the passage space 30, and between the conveying port 81 and the outside of the passage space 30, and also includes a retrieval door 85 that separates the interior of the passage space 30 from the outside. Also, the conveying port 81 includes a stacker crane (not shown) for placing landed unmanned aerial vehicles 11 in the storage rack 83. Note that the conveying port 81 may be capable of only either the taking off and landing of unmanned aerial vehicles 11 or the delivery and reception of articles W. In the case where the conveying port 81 can deliver and receive articles W, it is desirable that the conveying port 81 is provided at a plurality of locations in the up-down direction Z along the passage space 30. According to this configuration, articles W can be transported in the up-down direction Z by unmanned aerial vehicles 11 that fly stably. Articles W can thus be efficiently transported over a plurality of floors of a building, for example.

Other Embodiments

Next, other embodiments of the operation facility 10 for an unmanned aerial vehicle 11 will be described.

(1) In the first, second, fourth, and fifth embodiments, an example is described in which the passage space 30, through which the unmanned aerial vehicle 11 ascends and descends, extends along the up-down direction Z. However, there is no limitation to this example, and the extending direction of the passage space 30 may be inclined relative to the up-down direction Z, as in the third embodiment. Also, the passage space 30 does not need to be shaped as a straight tube, and may be shaped such that the cross-sectional area changes depending on the position in the up-down direction Z, or be shaped with a curve or a bend when viewed from the side, for example. Also, the passage space 30 may be a passage exclusively for ascent of unmanned aerial vehicles 11, or a passage exclusively for descent. Also, in the first to fourth embodiments described above, the operation facility 10 may include the conveying port 81 as in the fifth embodiment described above.

(2) In the above embodiments, an example is described in which the passage space 30 is provided in the multi-story facility 20 and disposed through the partition wall 24 between the upper level 21*u* and the lower level 21*d*, which are two clean rooms. However, there is no limitation to this example, and the passage space 30 may be a passage that extends in the up-down direction Z in a building that has one above-ground floor, for example. Also, the upper level 21*u* and the lower level 21*d* do not need to be clean rooms, and the levels are not necessarily required to be partitioned by the partition wall 24. Also, the passage space 30 does not necessarily need to be defined by the tubular wall 32.

(3) In the above embodiments, an example is described in which the air pressure control system 40 includes the air discharge unit 42 and the air supply unit 52. However, there is no limitation to this example, and only either the air discharge unit 42 or the air supply unit 52 may be provided. Also, a configuration is possible in which the air pressure control system 40 does not include the air discharge unit 42 and the air supply unit 52, and the air pressure in the passage space 30 is controlled by another method. Moreover, a configuration is possible in which air is only discharged from the uppermost portion of the passage space 30, or air is only supplied to the lowermost portion of the passage space 30.

(4) In the above embodiments, an example is described in which the air pressure control system 40 includes the position information acquirer 60 that acquires position information indicating the position of an unmanned aerial vehicle 11. However, there is no limitation to this example, and the air pressure control system 40 may control the air pressure in the passage space 30 without acquiring position information indicating the position of an unmanned aerial vehicle 11. Also, the position information indicating the position of an unmanned aerial vehicle 11 that is acquired by the position information acquirer 60 may be coordinate information acquired by GPS (Global Positioning System) processing, RTK (Realtime Kinematic) processing, or processing performed on an image captured by an imaging device, for example.

(5) In the above embodiments, an example is described in which the upper door controller 72 closes the upper door 34*u* when a descending unmanned aerial vehicle 11 is detected by the air discharge-side lower sensor 63. However, there is no limitation to this example, and a configuration is possible in which the upper door controller 72 closes the upper door 34*u* when the descending unmanned aerial vehicle 11 is no longer detected by the air discharge side upper sensor 62, for example. Also, the upper door controller 72 may open and close the upper door 34*u* based on coordinate information regarding the unmanned aerial vehicle 11 acquired by the position information acquirer 60.

(6) In the above embodiments, an example is described in which the lower door controller 78 closes the lower door 34*d* when an ascending unmanned aerial vehicle 11 is detected by the air supply-side upper sensor 67. However, there is no limitation to this example, and the lower door controller 78 may close the lower door 34*d* when the ascending unmanned aerial vehicle 11 is no longer detected by the air supply-side lower sensor 68, for example. Also, the lower door controller 78 may open and close the lower door 34*d* based on coordinate information regarding the unmanned aerial vehicle 11 acquired by the position information acquirer 60.

(7) Note that configurations disclosed in the above-described embodiments can also be applied in combination with configurations disclosed in other embodiments as long as no contradiction arises. Regarding other configurations as well, the embodiments disclosed in this specification are merely examples in all respects. Therefore, various modifications can be made as appropriate without departing from the scope of the present disclosure.

Overview of Above Embodiments

Hereinafter, aspects of the above-described operation facility for an unmanned aerial vehicle described above will be described.

An operation facility for an unmanned aerial vehicle with rotary wing, according to an aspect of the present disclosure, includes: a passage space extending in an up-down direction, and through which the unmanned aerial vehicle is capable of ascending and descending; and an air pressure control system configured to control air pressure in the passage space, wherein the air pressure control system performs control in such a manner that an air pressure above the unmanned aerial vehicle is lower than an air pressure below the unmanned aerial vehicle.

According to this configuration, the air pressure above the unmanned aerial vehicle is lower than the air pressure below the unmanned aerial vehicle, thus making it easier for the unmanned aerial vehicle to secure lift force. This therefore makes it possible to more easily stabilize the flight of the unmanned aerial vehicle. It is also possible to reduce the amount of energy consumed by the unmanned aerial vehicle in order to secure lift force, thus making it possible to more easily improve the energy efficiency of flight of the unmanned aerial vehicle.

In another aspect, it is preferable that the air pressure control system includes at least either one of: an air discharge unit provided in an upper portion of the passage space and configured to discharge air from the passage space; and an air supply unit provided in a lower portion of the passage space and configured to supply air to the passage space.

According to this configuration, it is possible to appropriately control the air pressure around the unmanned aerial vehicle in the passage space.

In another aspect, it is preferable that the air pressure control system includes: an air discharge unit provided in an upper portion of the passage space and configured to discharge air from the passage space; and an air supply unit provided in a lower portion of the passage space and configured to supply air to the passage space, the passage space is defined by a tubular wall extending in the up-down direction and disposed through at least one partition wall each of which is disposed between adjacent levels of consecutive levels, and the air discharge unit and the air supply unit pass through the tubular wall.

According to this configuration, the air discharge unit is provided so as to allow the flow of air between the inside and outside of the passage space, and the air supply unit is provided so as to allow the flow of air between the inside and outside of the passage space, thus making it possible for the control of the air pressure in the passage space to be performed more appropriately by the air pressure control system.

In another aspect, it is preferable that in a case where the unmanned aerial vehicle is to pass through a first region, which is a region in the up-down direction in which the air discharge unit is arranged in the passage space, the air pressure control system sets an air discharge pressure of the air discharge unit to a value lower than before entrance of the unmanned aerial vehicle into the first region, and in a case where the unmanned aerial vehicle is to pass through a second region, which is a region in the up-down direction in which the air supply unit is arranged in the passage space, the air pressure control system sets an air supply pressure of the air supply unit to a value lower than before entrance of the unmanned aerial vehicle into the second region.

According to this configuration, in the case where the unmanned aerial vehicle is to pass through the first region, it is possible to reduce the likelihood that a decrease in air pressure caused by the air discharge unit adversely affects the flight of the unmanned aerial vehicle, and in the case where the unmanned aerial vehicle is to pass through the second region, it is possible to reduce the likelihood that an increase in air pressure caused by the air supply unit adversely affects the flight of the unmanned aerial vehicle. Therefore, it is possible to stabilize the flight of the unmanned aerial vehicle both when the unmanned aerial vehicle is to pass through the first region and when the unmanned aerial vehicle is to pass through the second region.

In another aspect, it is preferable that the air pressure control system includes: a first detector configured to detect approach of the unmanned aerial vehicle toward the first region; and a second detector configured to detect approach of the unmanned aerial vehicle toward the second region, the air pressure control system determines in response to the first detector detecting the unmanned aerial vehicle that the unmanned aerial vehicle is to pass through the first region, and the air pressure control system determines in response to the second detector detecting the unmanned aerial vehicle that the unmanned aerial vehicle is to pass through the second region.

According to this configuration, it is possible to appropriately determine a case where the unmanned aerial vehicle is to pass through the first region and a case where the unmanned aerial vehicle is to pass through the second region.

In another aspect, it is preferable that the operation facility for an unmanned aerial vehicle further includes: a door configured to partition the passage space in the up-down direction, and provided at least in a lower portion of the passage space, wherein the door is opened in a case where the unmanned aerial vehicle is to pass through, and is closed after the unmanned aerial vehicle passes through.

According to this configuration, even if the unmanned aerial vehicle crashes inside the passage space, it is possible to easily avoid the case where the unmanned aerial vehicle falls down out of the passage space. Moreover, in the case where it is not preferable to allow the flow of air in the up-down direction through the passage space, such a flow of air can be restricted.

In another aspect, it is preferable that the air pressure control system includes: a position information acquirer configured to acquire position information indicating a position of the unmanned aerial vehicle; and at least one air pressure detector configured to detect air pressures at respective locations arranged in the up-down direction in the passage space, wherein the air pressure control system controls the air pressure in the passage space based on the position information acquired by the position information acquirer and the air pressures detected by the at least one air pressure detector.

According to this configuration, control for setting the air pressure above the unmanned aerial vehicle to a value lower than the air pressure below the unmanned aerial vehicle can be appropriately performed in accordance with the position of the unmanned aerial vehicle.

In another aspect, it is preferable that the passage space is shaped as a column inclined to a side in a horizontal direction.

According to this configuration, when the unmanned aerial vehicle descends, it is possible to easily avoid a vortex ring state, which is a state in which a rotary wing unmanned aerial vehicle falls into its own downwash and loses lift force. It is therefore easy to stabilize the flight of the unmanned aerial vehicle during descent.

What is claimed is:

1. An operation facility for an unmanned aerial vehicle with rotary wing, the operation facility comprising:

- a passage space extending in an up-down direction, and through which the unmanned aerial vehicle is capable of ascending and descending; and
- an air pressure control system configured to control air pressure in the passage space, wherein the air pressure control system performs control in such a manner that an air pressure above the unmanned aerial vehicle is lower than an air pressure below the unmanned aerial vehicle,
- wherein the passage space is defined by a tubular wall extending in the up-down direction, disposed through at least one partition wall, each partition wall being disposed between adjacent levels of consecutive levels, and the passage space is formed into a tubular shape with an open bottom so as to have an opening through which the unmanned aerial vehicle can pass, and
- wherein the air pressure control system comprises at least either one of:
  - an air discharge unit provided in an upper portion of the passage space through the tubular wall and configured to discharge air from the passage space; and
  - an air supply unit provided in a lower portion of the passage space through the tubular wall and configured to supply air to the passage space.

2. The operation facility according to claim 1, further comprising:

- a door configured to partition the passage space in the up-down direction, and provided at least in a lower portion of the passage space,
- wherein the air pressure control system comprises the air discharge unit, and
- wherein the door is disposed below a second region, which is a region in the up-down direction in which the air supply unit is arranged in the passage space, and opened in a case where the unmanned aerial vehicle is to pass through, and is closed after the unmanned aerial vehicle passes through.

3. The operation facility according to claim 1,

- wherein the air pressure control system comprises:
  - a position information acquirer configured to acquire position information indicating a position of the unmanned aerial vehicle; and
  - at least one air pressure detector configured to detect air pressures at respective locations arranged in the up-down direction in the passage space, and
- wherein the air pressure control system controls the air pressure in the passage space based on the position information acquired by the position information acquirer and the air pressures detected by the at least one air pressure detector.

4. The operation facility according to claim 1,

- wherein the passage space is shaped as a column inclined to a side in a horizontal direction.

5. The operation facility according to claim 1, further comprising:

- a door that opens and closes the opening.

6. An operation facility for an unmanned aerial vehicle with rotary wing, the operation facility comprising:

- a passage space extending in an up-down direction, and through which the unmanned aerial vehicle is capable of ascending and descending; and
- an air pressure control system configured to control air pressure in the passage space, wherein the air pressure control system performs control in such a manner that an air pressure above the unmanned aerial vehicle is lower than an air pressure below the unmanned aerial vehicle,
- wherein the air pressure control system comprises:
  - an air discharge unit provided in an upper portion of the passage space and configured to discharge air from the passage space; and
  - an air supply unit provided in a lower portion of the passage space and configured to supply air to the passage space,
  - wherein the passage space is defined by a tubular wall extending in the up-down direction and disposed through at least one partition wall each of which is disposed between adjacent levels of consecutive levels, and
  - wherein the air discharge unit and the air supply unit pass through the tubular wall,
  - wherein in a case where the unmanned aerial vehicle is to pass through a first region, which is a region in the up-down direction in which the air discharge unit is arranged in the passage space, the air pressure control system sets an air discharge pressure of the air discharge unit to a value lower than before entrance of the unmanned aerial vehicle into the first region, and wherein in a case where the unmanned aerial vehicle is to pass through a second region, which is a region in the up-down direction in which the air supply unit is arranged in the passage space, the air pressure control system sets an air supply pressure of the air supply unit to a value lower than before entrance of the unmanned aerial vehicle into the second region.

7. The operation facility according to claim 6, wherein the air pressure control system comprises:

a first detector configured to detect approach of the unmanned aerial vehicle toward the first region; and a second detector configured to detect approach of the unmanned aerial vehicle toward the second region, wherein the air pressure control system determines in response to the first detector detecting the unmanned aerial vehicle that the unmanned aerial vehicle is to pass through the first region, and wherein the air pressure control system determines in response to the second detector detecting the unmanned aerial vehicle that the unmanned aerial vehicle is to pass through the second region.

* * * * *